United States Patent
Zou et al.

(10) Patent No.: US 12,181,490 B2
(45) Date of Patent: Dec. 31, 2024

(54) MODE DECOMPOSITION METHOD APPLICABLE TO FLOW FIELD ANALYSIS AND RECONSTRUCTION OF INTERNAL SOLITARY WAVE TEST

(71) Applicant: DALIAN UNIVERSITY OF TECHNOLOGY, Liaoning (CN)

(72) Inventors: Li Zou, Liaoning (CN); Tiezhi Sun, Liaoning (CN); Jiuming Zhang, Liaoning (CN); Yuguo Pei, Liaoning (CN); Zhenhao Li, Liaoning (CN); Xinyu Ma, Liaoning (CN); Zhe Sun, Liaoning (CN); Zongbing Yu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 587 days.

(21) Appl. No.: 17/596,241

(22) PCT Filed: Dec. 31, 2019

(86) PCT No.: PCT/CN2019/130246
§ 371 (c)(1),
(2) Date: Aug. 26, 2022

(87) PCT Pub. No.: WO2020/244217
PCT Pub. Date: Dec. 10, 2020

(65) Prior Publication Data
US 2022/0390481 A1 Dec. 8, 2022

(30) Foreign Application Priority Data
Jun. 6, 2019 (CN) .......................... 201910493653.0

(51) Int. Cl.
*G01P 5/20* (2006.01)
*G06F 17/16* (2006.01)
(Continued)

(52) U.S. Cl.
CPC ................ *G01P 5/20* (2013.01); *G06F 17/16* (2013.01); *G06F 18/2135* (2023.01); *G06F 18/22* (2023.01)

(58) Field of Classification Search
CPC ........ G01P 5/20; G06F 17/16; G06F 18/2135; G06F 18/22; G06F 18/213; G06F 30/20; G06V 20/52; Y02A 90/10
See application file for complete search history.

(56) References Cited

U.S. PATENT DOCUMENTS

2012/0109601 A1   5/2012   Avera

FOREIGN PATENT DOCUMENTS

| CN | 107704427 A | 2/2018 |
|----|-------------|--------|
| CN | 110222306 A | 9/2019 |

OTHER PUBLICATIONS

Zhang, Ying, "Experiment on three-dimensional characteristics for internal solitary waves past an Island", Chinese Master's Theses Full-text Database, No. 02, Feb. 15, 2015, ISSN: 1674-0246.
(Continued)

*Primary Examiner* — Tarun Sinha
(74) *Attorney, Agent, or Firm* — NKL Law; Allen Xue

(57) ABSTRACT

An improved modal decomposition method applicable to the analysis and reconstruction of the measured flow fields of internal solitary waves includes the following steps: S1. generating internal solitary waves and measuring a two-dimensional flow field sequence during the interaction of the internal solitary waves with the terrain; S2. extracting a target information from the two-dimensional flow field sequence and obtaining a flow field snapshot; S3. stitching the snapshots into a snapshot matrix in time order; S4. plotting the information density curve; S5. normalizing the information density curve and determining split points; S6. setting the snapshot matrix between two adjacent split points (Continued)

as a linear evolutionary characteristic stage; and S7. performing dynamic mode decomposition on the linear evolutionary characteristic stages.

4 Claims, 7 Drawing Sheets

(51) Int. Cl.
    *G06F 18/2135*     (2023.01)
    *G06F 18/22*     (2023.01)

(56) References Cited

OTHER PUBLICATIONS

H. Michallet et al., "Experimental study of interfacial solitary waves", Journal of Fluid Mechanics, vol. 366, pp. 159-177; Jul. 10, 1998.

MODE DECOMPOSITION METHOD APPLICABLE TO FLOW FIELD ANALYSIS AND RECONSTRUCTION OF INTERNAL SOLITARY WAVE TEST

TECHNICAL FIELD

The present invention belongs to the field of ocean engineering and relates to a modal decomposition method, in particular to an improved modal decomposition method applicable to the analysis and reconstruction of the flow field of the internal solitary wave evolution.

BACKGROUND

The interaction between internal solitary waves and terrain is a complex flow process. The experimental study can use the gravity collapse method (Michallet, H., & Barthelemy, E. (1998). Experimental study of interfacial solitary waves. Journal of Fluid Mechanics, 366, 159-177) to control the generation of the internal solitary wave in the stratified wave tank, and obtain the flow field data by using Particle Image Velocimetry (PIV) technique. Based on the experimental data, it is necessary to capture the essential characteristics of the flow process through information extraction of flow field data.

According to the experimental flow field data, the dimensionality reduction in information technology can effectively extract the flow field information and provide a basis for further analysis. At present, the time snapshots of flow field are usually composed into snapshot matrix and processed by modal decomposition method.

When the time-varying characteristics between snapshots of the flow field are not of interest, the analysis is usually performed using the proper orthogonal decomposition method. The key idea is to project the high-dimensional data into the basis vectors and represent the flow field characteristics with the projection length obtained by the dimensionality reduction.

When the entire evolution of the flow field needs to be considered, the analysis is usually performed using the dynamic mode decomposition. The key idea is to assume that the evolution of high-dimensional data can be represented as a linear process. Then represent the entire process as a linear superposition of multiple time-dependent processes by introducing and computing the Koopman operator.

Current modal decomposition methods for flow field data can only address steady-state processes with a high sampling frequency or the processes not concerned with time-varying characteristics. It cannot meet the demand for analysis of non-stationary processes with low sampling frequency and low velocity. The interaction of internal solitary waves with terrains is such problem.

SUMMARY OF THE INVENTION

According to the above technical limitations, the present disclosure provides an improved modal decomposition method applicable to the analysis and reconstruction of the measured flow field of the internal solitary waves. The technical solutions used in the present invention are as follows.

An improved modal decomposition method applicable to the analysis and reconstruction of the measured flow fields of internal solitary waves, includes the following steps, S1. Generating internal solitary waves in the stratified wave tank by using the gravity collapse method, and measuring a two-dimensional flow field sequence at a same time interval during an interaction of the internal solitary wave with the terrain by using particle image velocimetry technique;

S2. Extracting the target information from the two-dimensional flow field sequence for each time interval and organizing it end to end in a column vector form, wherein the column vector is named as flow field snapshot;

S3. Stitching the flow field snapshots into a snapshot matrix in time order;

S4. Projecting the snapshot matrix on a orthogonal basis by performing principal component analysis method, then calculating the projection value of each flow field snapshot onto a major basis vector, wherein the projecting value is named as information density; plotting an information density curve according to the information density;

S5. Normalizing the information density curve and determining a upper envelope and maximum points of the upper envelope; according to a distance between adjacent maximum points and a value of minimal point between them, choosing effective maximum points, setting the effective maximum points as split point;

S6. Setting the snapshot matrix between two adjacent split points as a linear evolutionary characteristic stage;

S7. Performing dynamic modal decomposition on the linear evolutionary characteristic stages and extracting multi-order modes based on the energy ranking, completing noise reduction and reconstruction of the two-dimensional flow field sequence.

The target information can be one of vorticity, horizontal velocity and vertical velocity.

The principal component analysis method in step S4 includes the following steps, S41. Subtracting an average value of matrix elements from each element in the snapshot matrix to obtain a matrix X;

S42. Computing a covariance matrix of the matrix X, $$C = \frac{1}{m} X X^T,$$

wherein m represents the column number of the snapshot matrix and $X^T$ represents the transposed matrix of the matrix X;

S43. Computing eigenvalues and eigenvectors of the covariance matrix C, setting the eigenvector corresponding to the maximum eigenvalue as the main base vector V;

S44. Computing the projection value of each time snapshot on the main base vector, Y=VX, wherein Y is the projection value.

The dynamic mode decomposition method in step S7 includes the following steps:

S71. Expressing the two adjacent flow field snapshots as $v_{i+i}=Kv_i$ by using the Koopman operator K. The value of the Koopman operator is not determined at this moment and is replaced by the symbol variable only;

S72. To compute the Koopman operator, dividing the snapshot matrix into two parts, $A_1=[v_1 \sim v_{n-1}]$ and $A_2=[v_2 \sim v_n]$, builting the relationship between $A_1$ and $A_2$ by the Koopman operator, $A_2=KA_1$. In turn, K can be approximated by the pseudo-inverse matrix of $A_1$ as $K \approx A_2 A_1^+$;

S73. Considering that the dimension of the snapshot matrix may be very high, resulting in too much computation to find the pseudo-inverse matrix, introducing the singular value decomposition to $A_1$ in order to increase the generality of the method, $A_1=U\Sigma V^*$, wherein U and V are unitary matrixes, $\Sigma$ is a semi positive definite diagonal matrix, and rewriting K as $K \approx A_2 V \Sigma^{-1} U^*$;

S74. Representing the eigenvalue decomposition form of the Koopman operator as $K\phi_i=\lambda_i\phi_i$, wherein $\phi_i$ is the eigenvalue and $\lambda_i$ is the corresponding eigenvalue. According to the form of K in step S73, writing the eigenvector as $\phi=[(\phi_1 \sim \phi_n]=A_1'V\Sigma^{-1}U$;

S75. Setting the above eigenvectors as a set of basis vectors in the Hilbert space, and decomposing each snapshot into $v_i=\Sigma\phi_i c_i$ by projecting onto this set of basis vectors, wherein $c_1$ is the weight of each mode;

S76. Representing the $n^{th}$-column of the snapshot matrix as $v_n=A^n v_0=A^n\Sigma\phi_{0i}c_{0i}=\Sigma\lambda^n\phi_{0i}c_{0i}$, which is the result of the dynamic mode decomposition.

In step S7, the first six modes are extracted to reconstruct the process. The quality of the reconstruction is related to the extracted mode number. For our problem, the reconstruction usually can be achieved by extracting the first six modes, and increasing the number of extracted modes can improve the reconstruction quality.

The present invention has the following advantages,

1. The significantly strong nonlinear process of internal solitary waves flowing over the terrain can be split into multiple linear processes that can be fitted with high-dimensional linearity by using the present invention. The results can provide a basis for segmentation of flow evolutionary characteristic stages.

2. The present invention is able to extract dynamic modes for such non-stationary processes with low sampling frequency and low velocity as internal solitary waves flowing over the terrain. And it can realize the functions of flow field reconstruction and noise reduction to provide the methods for further analysis of the flow.

Based on the above reasons the present invention could be widely promoted in the field of modal decomposition method.

DETAILED DESCRIPTION OF DRAWINGS

In order to illustrate more clearly the technical solutions in the embodiments of the invention or the existing technology, a brief description of the drawings accompanying the manual is as follows. It will be apparent that the drawings in the following description are some examples of the invention, and that other drawings could be obtained from them without creative work for those skilled in this technical field.

DETAILED DESCRIPTION OF PREFERRED EMBODIMENTS

In order to make the purpose, technical solutions and advantages of the invention embodiments, the technical details in the invention will be clearly and completely described based on the drawings as follows. It is clear that the embodiments described here are some, but not all, of the embodiments of the present invention. Based on the embodiments in the present invention, all other embodiments obtained without creative work for those skilled in this technical field are within the scope of protection of the present invention.

Figure 1:
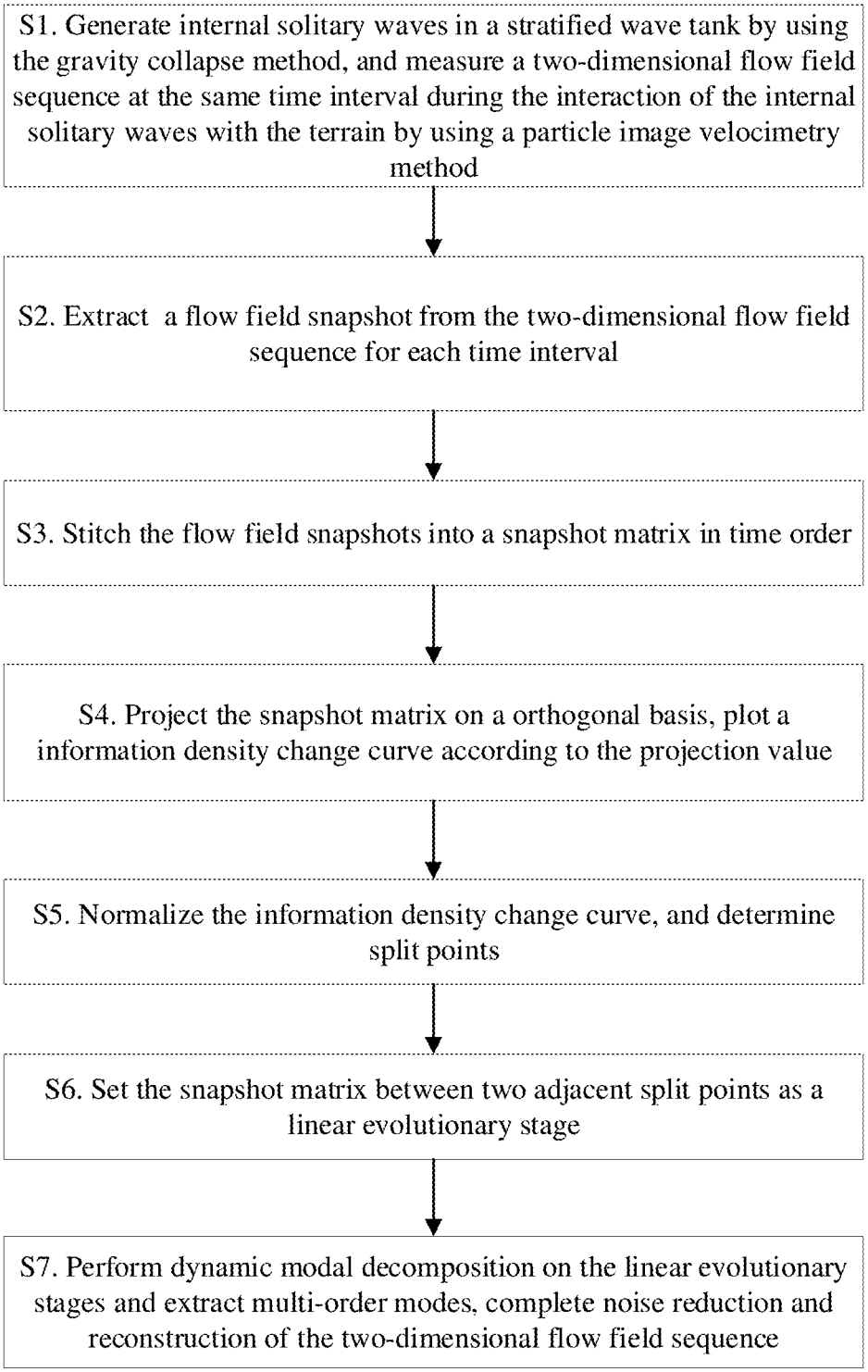
FIG. 1 is a flow chart of the embodiment of the present invention "an improved modal decomposition method applicable to the analysis and reconstruction of the measured flow fields of internal solitary waves".
Figure 2:
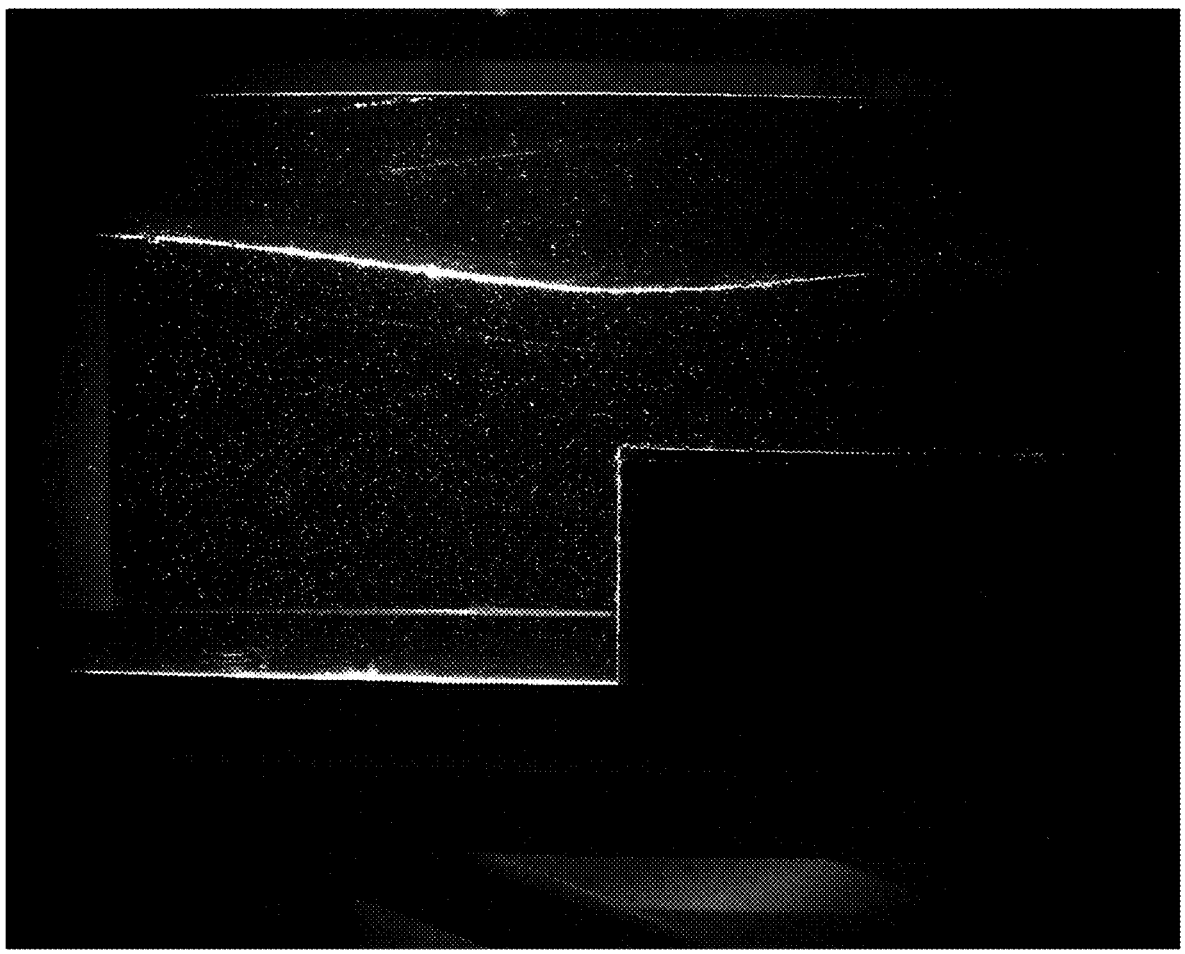
FIG. 2 is the original picture captured by the industrial Charge-coupled Device (CCD) camera in the embodiment of the present invention.
Figure 3:
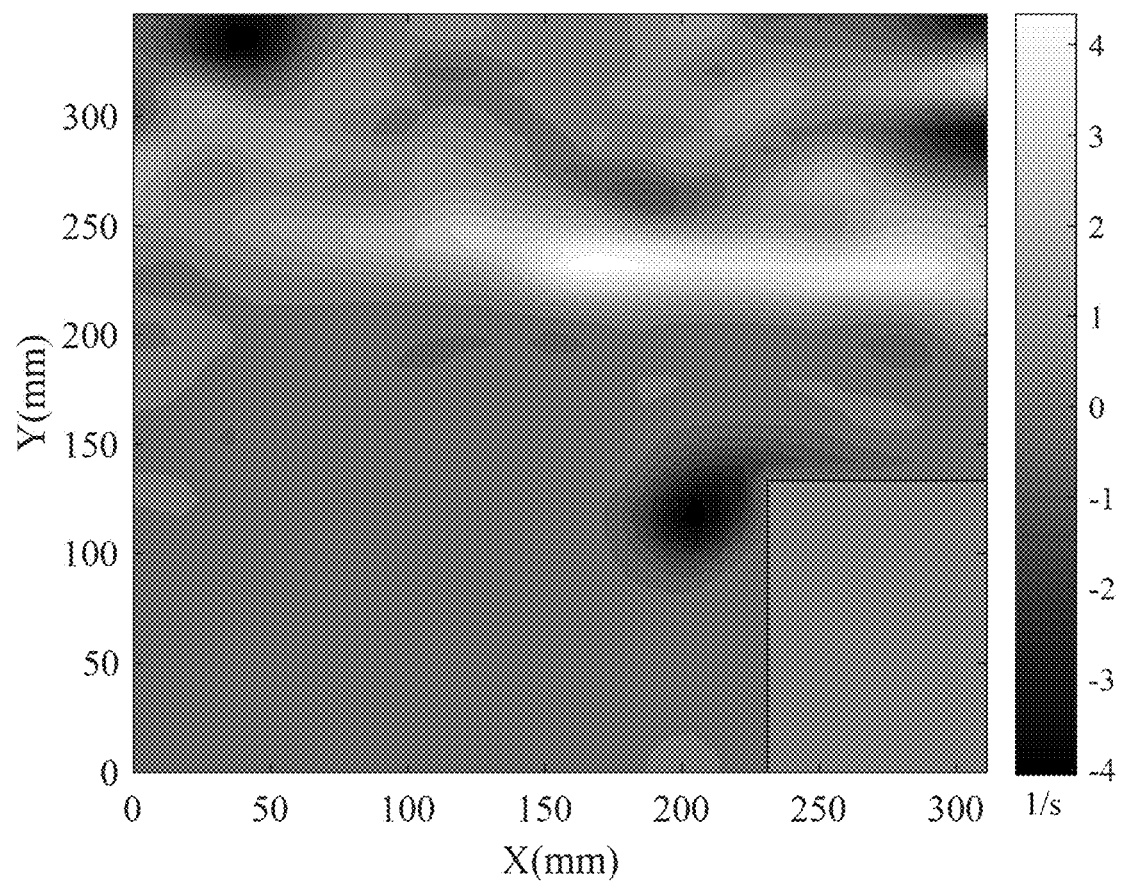
FIG. 3 is the typical vorticity field obtained by processing from the original pictures in the embodiment of the present invention.
Figure 4:
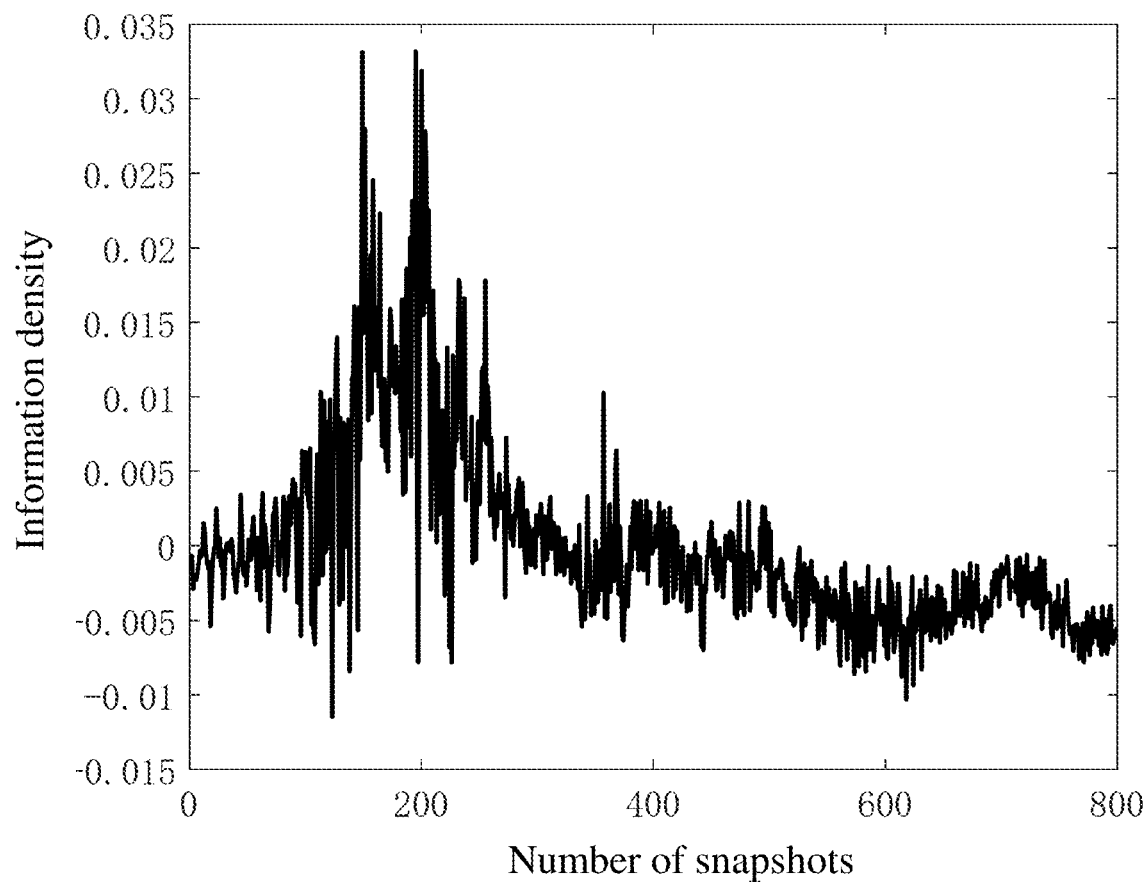
FIG. 4 is the information density curve in the embodiment of the present invention.

As shown in FIGS. 1-7, the embodiment set the vorticity as the target information. The original pictures are captured by the industrial CCD camera in the internal solitary wave experiments, and the typical result is shown in FIG. 2. The typical vorticity field obtained by processing the original pictures is shown in FIG. 3. The present invention an improved modal decomposition method applicable to the analysis and reconstruction of the measured flow fields of internal solitary waves includes the following steps, S1. Generate internal solitary waves in the stratified wave tank by using the gate-type wave maker, and measure the two-dimensional flow field sequence at the same time interval during the interaction of the internal solitary wave with the terrain by using particle image velocimetry method;

S2. Extract the target information from the two-dimensional flow field sequence for each time interval and organize it end to end in a column vector. The column vector is named as flow field snapshot;

S3. Stitch the flow field snapshots into a snapshot matrix in time order;

S4. Project the snapshot matrix on the orthogonal basis by performing principal component analysis method. Then calculate the projection value of each flow field snapshot onto the major basis vector. The projection value is named as the information density. Plot the information density curve according to the information density. The information density curve is shown in FIG. 4. The x-axis is for the snapshot number and the y-axis is for the normalized projection value.

The principal component analysis method in step S4 is as follows,

S41. Subtract the average value of matrix elements from each element in the snapshot matrix to obtain the matrix X;

S42. Compute the covariance matrix of the matrix X, $$C = \frac{1}{m} XX^T,$$

wherein m represents the column number of the snapshot matrix and $X^T$ represents the transposed matrix of the matrix X;

S43. Compute eigenvalues and eigenvectors of the covariance matrix C, and set the eigenvector corresponding to the maximum eigenvalue as the main base vector V;

S44. Compute the projection value of each time snapshot on the main base vector, Y=VX, wherein Y is the projection value.

Figure 5:
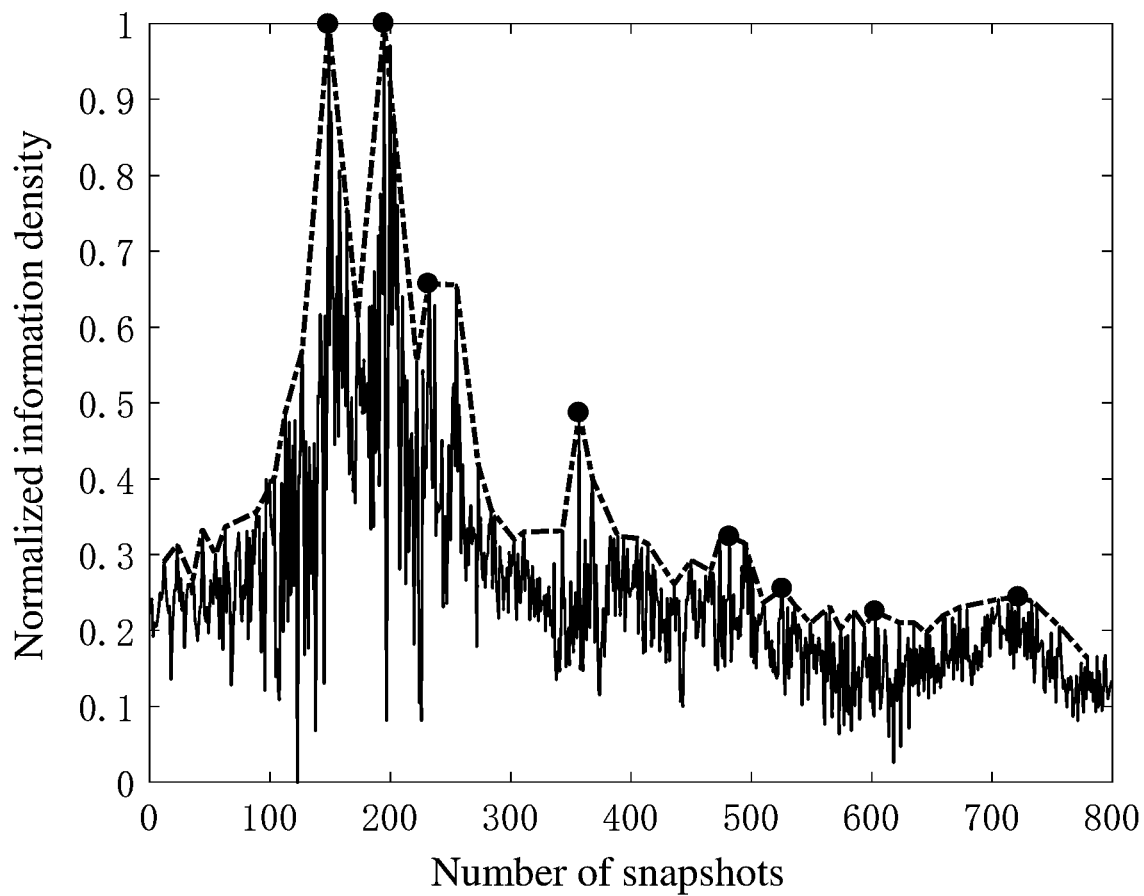
FIG. 5 is the normalized information density curve in the embodiment of the present invention.

S5. Normalize the information density curve and determine the upper envelope and the maximum points of the upper envelope. According to the distance between adjacent maximum points and the value of minimal point between them, choose the effective maximum points and set the effective maximum points as the split point. The selection of split points in step S5 is, The information density curve is first normalized and then the upper envelope of the curve is determined based on the location of the maxima of adjacent multiple points. The selection of the adjacent point number is related to sampling frequency and evolutionary velocity of flow field. In one embodiment, the sampling frequency is $\frac{1}{42}$s, and the local maximum of every 15 adjacent points is set as the data point for determining the upper envelope. Then, find the maximal points in the upper envelope data points and define the minimal points between two adjacent maximal points as the valley value. A maximal point with an interval distance of less than 30 frames from an adjacent maximal point and a difference of less than 0.5 from an adjacent valley value is defined as an invalid maximal point. After removing the invalid maximal points, the valid maximal points are set as the split point. The normalized information curve, the upper envelope and the split points are shown in FIG. 5;

S6. Set the snapshot matrix between two adjacent split points as a linear evolutionary characteristic stage;

S7. Perform dynamic modal decomposition on the linear evolutionary characteristic stages and extract multi-order modes based on the energy ranking. The noise reduction and reconstruction of the two-dimensional flow field sequence is completed.

Figure 6:
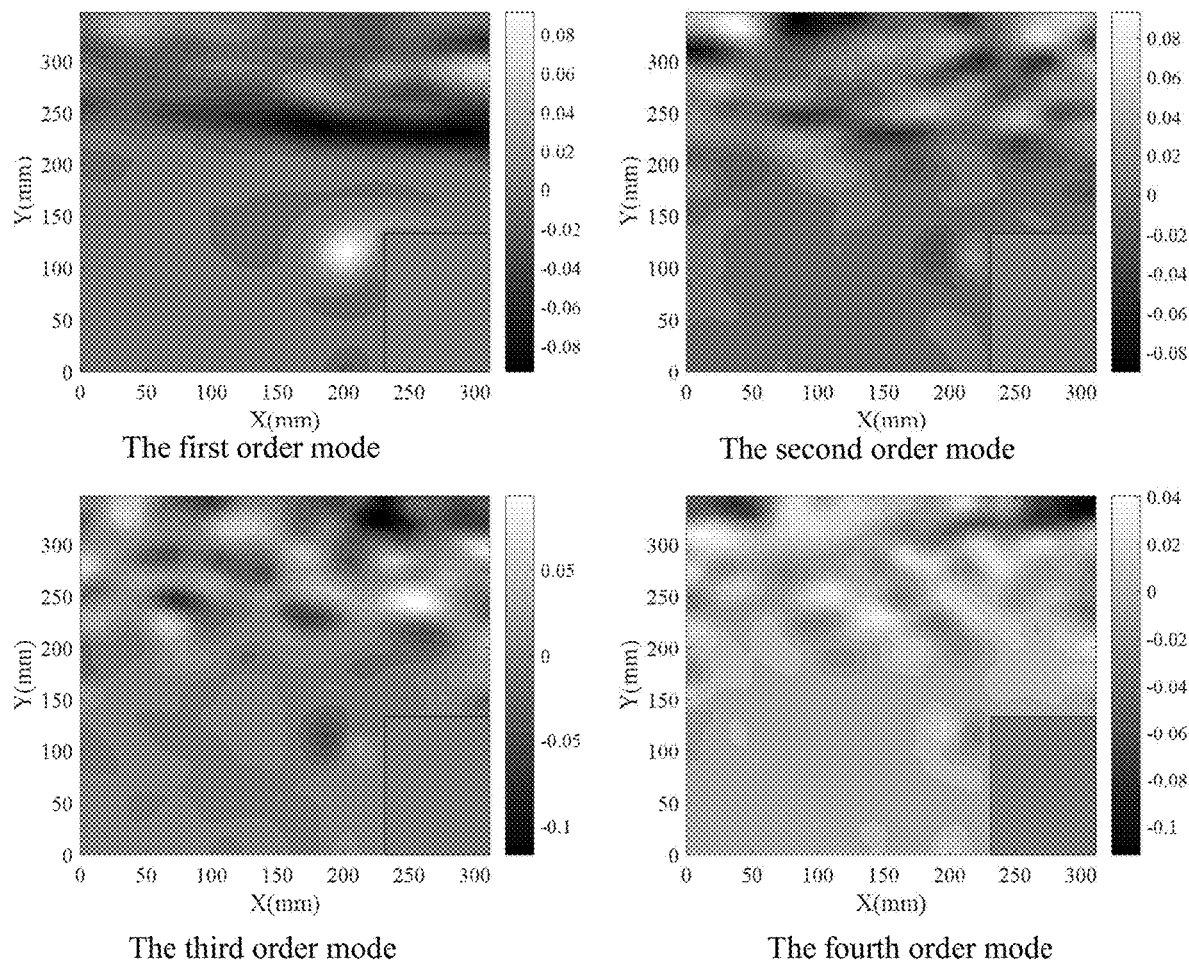
FIG. 6 is the first four order modes of a typical temporal snapshot segmentation of the internal solitary wave flowing over the terrain in the embodiment of the present invention.

The method of dynamic mode decomposition is,

Assuming that the evolutionary of a dynamic system can be expressed as $u_{k+1}=f(u_k)$, and there exist a linear operator K that can express the scalar function of the dynamic system as $Kg(u_k)=g(f(u_k))$. Perform the eigenvalue decomposition on the linear operator K to obtain $K\Phi_j(u)=\lambda_j \Phi_j(u)$. Each snapshot of the dynamic system can be further expressed as, $$g(u_{k+1})=k^k{}_g(u_1)=K^k\Sigma_{j=1}^{\infty}\Phi_j(u_1)c_i=\Sigma_{j=1}^{\infty}\lambda_j^k\Phi_j(u_1)c_i,$$

wherein $\Phi_1$ are the decomposed modes. In one embodiment, the first four order modes of a typical snapshot within the process that internal solitary wave flowing over the terrain are shown in FIG. 6. The quality of the reconstruction is related to the mode numbers. The reconstruction usually can be realized by extract the first six order modes for the similar problem, and the quality can be further improved by increasing the mode number.

Figure 7:
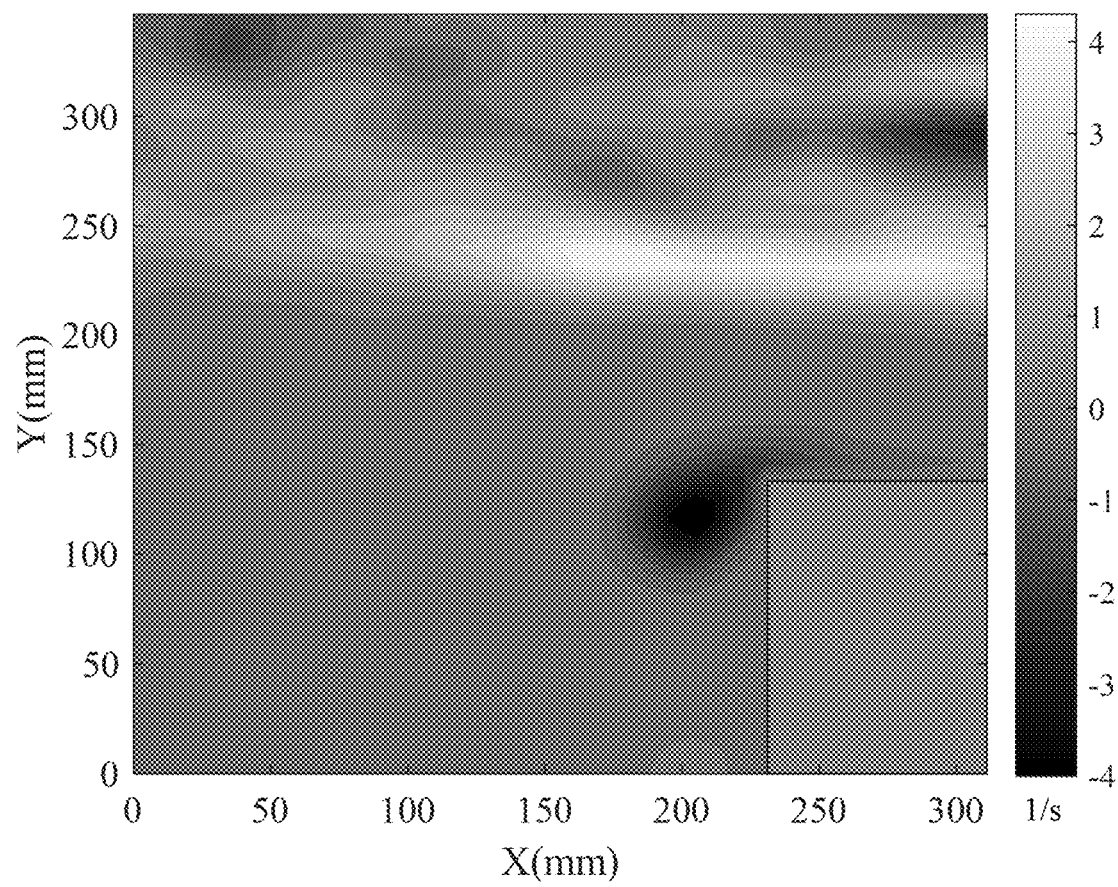
FIG. 7 is a typical vorticity field after noise reduction and reconstruction in the embodiment of the present invention.

Based on decomposed modes, each snapshot is noise reduced and reconstructed by using linear superposition $g(u_{k+1})=\Sigma_{j=1}^{\infty}\lambda_j^k\Phi_j(u_1)c_i$. The result of the noise reduction and reconstruction for FIG. 3 is shown in FIG. 7.

Based on modal decomposition method of the present invention, the PIV experimental measurement data can be used as the input data to meet the analysis needs of non-stationary process with a low sampling frequency and low velocity, such as the internal solitary wave flowing over the terrain. Based on this, modal extraction, and noise reduction and reconstruction of the flow field can be accomplished.

Finally, it should be noted that the above embodiment is intended only to illustrate the technical solutions of the invention and not to limit it. Although the detailed description of the invention with reference to the above embodiment, it should be understood by those skilled in the technical field that is still possible to modify the technical solutions recorded in the preceding embodiment or to replace some or all of them with equivalent technical feature. These modifications or substitutions, however, do not take the essence of the corresponding technical solutions out of the scope of the technical solutions of the various embodiments of the invention.

The invention claimed is:

1. An improved modal decomposition method applicable to the analysis and reconstruction of measured flow fields of internal solitary waves, comprising the following steps, S1. generating internal solitary waves in a stratified experimental wave tank by using the gravity collapse method, and measuring a two-dimensional flow field sequence at a same time interval during an interaction of the internal solitary wave with the terrain by using particle image velocimetry method;

S2. extracting target information from the two-dimensional flow field sequence for each time interval and organizing it end to end in column vector form, wherein the column vector for each moment is named as flow field snapshot;

S3. stitching the flow field snapshots into a snapshot matrix in time order;

S4. projecting the snapshot matrix on a orthogonal basis by performing principal component analysis method, then calculating a projection value of each flow field snapshot onto a major basis vector, wherein the projection value is named as information density; plotting an information density curve according to the information density;

S5. normalizing the information density curve and determining a upper envelope and maximum points of the upper envelope; according to a distance between adjacent maximum points and a value of minimal point between them, choosing effective maximum points; setting the effective maximum points as split point;

S6. setting the snapshot matrix between two adjacent split points as a linear evolutionary characteristic stage; and S7. performing dynamic modal decomposition on the linear evolutionary characteristic stages and extracting multi-order modes based on energy ranking, completing noise reduction and reconstruction of the two-dimensional flow field sequence.

2. The improved modal decomposition method applicable to the analysis and reconstruction of measured flow fields of internal solitary waves according to claim 1, wherein the target information is one of vorticity, horizontal velocity, and vertical velocity.

3. The improved modal decomposition method applicable to the analysis and reconstruction of measured flow fields of internal solitary waves according to claim 1, wherein in step S4, the principal component analysis method comprises the following steps:

S41. subtracting an average value of matrix elements from each element in the snapshot matrix to obtain a matrix X;

S42. computing a covariance matrix of the matrix X, $$C=\frac{1}{m}XX^T,$$

wherein, m represents the column number of the snapshot matrix and $X^T$ represents the transposed matrix of the matrix X;

S43. computing eigenvalues and eigenvectors of the covariance matrix C, setting the eigenvector corresponding to the maximum eigenvalue as the main base vector V;

S44. computing the projection value of each time snapshot on the main base vector, Y=VX, wherein Y is the projection value.

4. The improved modal decomposition method applicable to the analysis and reconstruction of measured flow fields of internal solitary waves according to claim 1, wherein a number of extracted modes in step S7 is 6.

* * * * *